US008126853B2

(12) United States Patent
Sakamoto

(10) Patent No.: US 8,126,853 B2
(45) Date of Patent: Feb. 28, 2012

(54) LOG MANAGING APPARATUS, LOG MANAGING SYSTEM, LOG MANAGING METHOD AND LOG MANAGING PROGRAM

(75) Inventor: Yuu Sakamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 265 days.

(21) Appl. No.: 12/553,708

(22) Filed: Sep. 3, 2009

(65) Prior Publication Data
US 2010/0082531 A1 Apr. 1, 2010

(30) Foreign Application Priority Data
Sep. 22, 2008 (JP) ................................ 2008-242706

(51) Int. Cl.
*G06F 17/00* (2006.01)
(52) U.S. Cl. ........................................ 707/688; 707/755
(58) Field of Classification Search .................. 707/609, 707/648, 688, 755, E17.01, 999.2; 714/E11.025, 714/E11.204, FOR. 297
See application file for complete search history.

(56) References Cited

U.S. PATENT DOCUMENTS

| 6,647,400 | B1 * | 11/2003 | Moran | ................................. | 1/1 |
| 7,072,912 | B1 * | 7/2006 | Verma et al. | .......................... | 1/1 |
| 7,260,588 | B2 * | 8/2007 | Werner | .......................... | 707/752 |
| 7,991,748 | B2 * | 8/2011 | Rowan et al. | .................. | 707/677 |
| 2005/0108289 | A1 * | 5/2005 | East et al. | ...................... | 707/200 |
| 2008/0215546 | A1 * | 9/2008 | Baum et al. | ........................ | 707/3 |
| 2009/0099866 | A1 * | 4/2009 | Newman | ........................... | 705/2 |

FOREIGN PATENT DOCUMENTS

| EP | 1429232 A2 * | 6/2004 |
| JP | 5-73168 | 3/1993 |
| JP | 2003141075 A | 5/2003 |
| JP | 2004295303 A | 10/2004 |
| JP | 2004334664 A | 11/2004 |
| JP | 2005284520 A | 10/2005 |
| JP | 2005327053 A | 11/2005 |
| JP | 2008210308 A | 9/2008 |

OTHER PUBLICATIONS

Japanese Office Action for JP2008-242706 issued May 25, 2010.

* cited by examiner

*Primary Examiner* — Robert Timblin
*Assistant Examiner* — Randall Burns

(57) ABSTRACT

A log managing apparatus includes a collecting unit that receives a log from at least one collecting object that acquires the log including time information, a management unit that manages log format information set for each the collecting object, and a conversion unit that converts the log with reference to the log format information and extracts time information from the log.

9 Claims, 13 Drawing Sheets

FIG.3

| Data storing location | Node | File path on node of collecting object | Size | Time stamp (updating time) |
|---|---|---|---|---|
| /var/opt/logmg/node1/file0000001 | node1 | /var/adm/syslog/syslog.log | 10240 | 2008/01/01 12:00:00 |
| /var/opt/logmg/node2/file0000001 | node2 | /var/adm/syslog/mail.log | 4096 | 2007/12/31 23:00:00 |
| /var/opt/logmg/node3/file0000002 | node3 | /var/adm/syslog/syslog.log | 1024 | 2008/01/02 12:00:00 |

Management information in log-log file storing module 101

FIG.4

| Log format | Node (possible to be enumerated) | File path or classification of log |
|---|---|---|
| SyslogFileFormat01 | node1, node2 | /var/adm/syslog/* syslog.log |
| SyslogFormat02 | node3 | Syslog |
| MailLogFileFormat01 | node1, node2 | /var/adm/syslog/mail.log.* |

...

⋮

Management information of log format managing module 112

FIG.5

SyslogFileFormat01

Character code
    "EUC-JP"
Time zone of log
    "GMT"
Segment of log record
    "^$"
Regular expression to normalize log
    "(([a-zA-Z]{3}[¥s]{1,2}[0-9]{1,2}¥s[0-9]{1,2}:[0-9]{1,2}:[0-9]{1,2}))¥s([^¥s]*)¥s([^¥s][^:]*:){0,1}¥s{0,1}(.*)"
Position of time information
    "1"
Form of time information
    "MMM dd HH:mm:ss"
Form of converted time information
    "yyyy/mm/dd HH:mm:ss"

SyslogFormat02

Character code
    "EUC-JP"
Time zone of log
    "JST"
Segment of log record
    "^$"
Regular expression to normalize log
    "<([0-9]{1,3})>(([a-zA-Z]{3}[¥s]{1,2}[0-9]{1,2}¥s[0-9]{1,2}:[0-9]{1,2}:[0-9]{1,2}))¥s([^¥s]*)¥s (.*)"
Presence of time information
    "presence"
Presence of host name
    "presence"
Position of time information
    "2"
Form of time information
    "MMM dd HH:mm:ss"
Form of converted time information
    "yyyy/mm/dd HH:mm:ss"
Position of stored log information
    "2,3,4"

Operation of log file collecting module 102

Operation of log-log file storing module 101

Operation of log referring module 104

Details of step S902

Operation of log collecting module 103

Details of step S1205

Operation of log-log file storing module 101

LOG MANAGING APPARATUS, LOG MANAGING SYSTEM, LOG MANAGING METHOD AND LOG MANAGING PROGRAM

This application is based upon and claims the benefit of priority from Japanese patent application No. 2008-242706, filed on Sep. 22, 2008, the disclosure of which is incorporated herein in its entirety by reference.

TECHNICAL FIELD

The present invention relates to a log managing apparatus, a log management system, a log managing method and a log managing program and in particular, relates to a log managing apparatus, a log management system, a log managing method and a log managing program, which manage time information.

BACKGROUND ART

A log collecting apparatus, which makes it easy to collect and analyze a log at a time of failure in a system including computers dispersed in a plurality of countries and time zones, is disclosed in Japanese Patent Application Laid-Open No. 2005-284520. However, the log collecting apparatus carries out conversion into Unicode after time correction of the log by use of a time zone and a character code which are specific for each machine. Therefore, the log collecting apparatus causes a problem that, in case that a byte string of time information of the log is expressed with a different kind of character code, the time information of the log may not be read correctly. Moreover, the log collecting apparatus causes another problem that, since the log collecting apparatus can not complement the time information in case that a certain log does not include the time information or lacks a part of the time information, the log collecting apparatus can not manage that log equivalently to the other logs. That is, the apparatus, which is described in Japanese Patent Application Laid-Open No. 2005-284520, causes a problem that it is impossible to carry out a proper log management on the basis of the time information.

SUMMARY

An exemplary object of the invention is to provide a log managing apparatus, a log managing system, a log managing method and a log managing program, which can grasp time information of a log correctly.

A log managing apparatus according to an exemplary aspect of the invention includes a collecting unit that receives a log from at least one collecting object that acquires the log including time information, a management unit that manages log format information set for each the collecting object, and a conversion unit that converts the log with reference to the log format information and extracts time information from the log.

A log managing system according to an exemplary aspect of the invention includes at least one of log collecting object including a transferring unit that acquires a log containing time information and transfers the acquired log to a log managing apparatus, and a log managing apparatus including a collecting unit that receives the log from the collecting object, a management unit that manages log format information set for each the collecting object, and a conversion unit that converts the log with reference to the log format information and extracts time information from the log.

A log managing method according to an exemplary aspect of the invention includes receiving a log from at least one collecting object that acquires the log containing time information, and converting the log with reference to log format information set for each the collecting object and extracting time information from the log.

A computer readable medium recording thereon a program, causing computer to perform a method according to an exemplary aspect of the invention includes receiving a log from at least one collecting object that acquires the log containing time information, and converting the log with reference to log format information set for each the collecting object and extracting time information from the log.

A log managing apparatus according to an exemplary aspect of the invention includes a collecting means for receiving a log from at least one collecting object that acquires the log containing time information, a management means for managing log format information set for each the collecting object, and a conversion means for converting the log with reference to the log format information and for extracting time information from the log.

A log management system according to an exemplary aspect of the invention includes at least one log collecting object including a transferring means for acquiring a log containing time information and for transferring the acquired log to a log managing means, a log managing apparatus including a collecting means for receiving the log from the collecting object, a management means for managing log format information set for each the collecting object, and a conversion means for converting the log with reference to the log format information and for extracting time information from the log.

A log management method according to an exemplary aspect of the invention includes a step for receiving a log from at least one collecting object that acquires the log containing time information, and a step for converting the log with reference to log format information set for each the collecting object and for extracting time information from the log.

BRIEF DESCRIPTION OF THE DRAWINGS

Exemplary features and advantages of the present invention will become apparent from the following detailed description when taken with the accompanying drawings in which:

FIG. 3 is an exemplary diagram showing management information in log-log file storing module 101;

FIG. 4 is an exemplary diagram showing management information of log format managing module 112;

FIG. 5 is an exemplary diagram showing an example of a log format;

EXEMPLARY EMBODIMENT

Next, an outline of an exemplary embodiment will be described.

Figure 1:
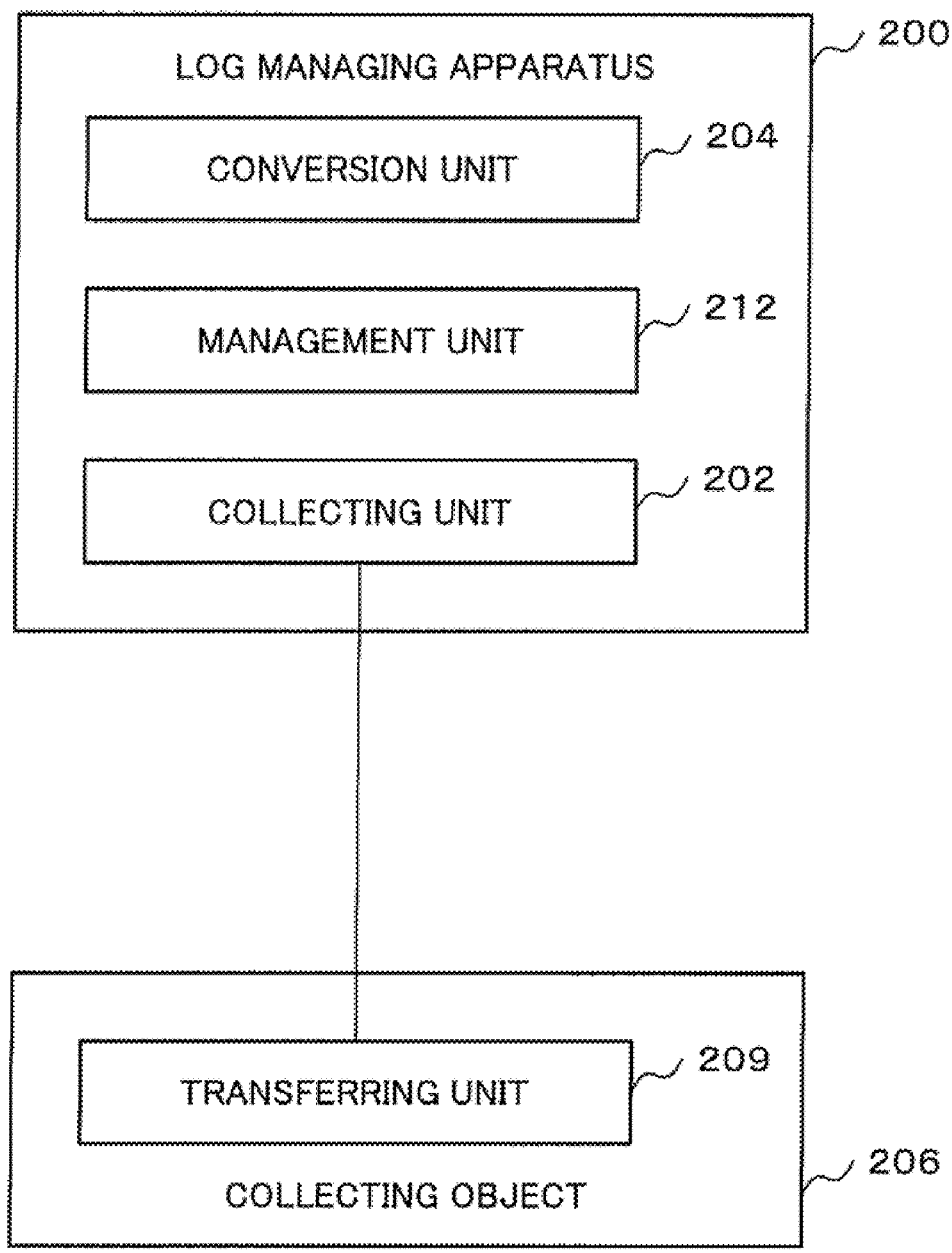
FIG. 1 is an exemplary diagram showing a configuration of log managing system 002.

FIG. 1 is an exemplary diagram showing a configuration of log managing system 002. Log managing system 002 includes log managing apparatus 200 and collecting object 206.

Log managing apparatus 200 includes collecting unit 202, conversion unit 204 and management unit 212.

Collecting unit 202 receives a log from at least one collecting object 206 which acquires the log including time information.

Management unit 212 manages a log format which is set for each collecting object 206.

Conversion unit 204 converts the log with reference to the log format information and extracts the time information.

Collecting object 206 includes transferring unit 209.

Transferring unit 209 acquires the log including the time information and transfer the log to log managing apparatus 200.

Next, a first exemplary embodiment of log managing system 001 will be described in detail with reference to drawings.

Figure 2:
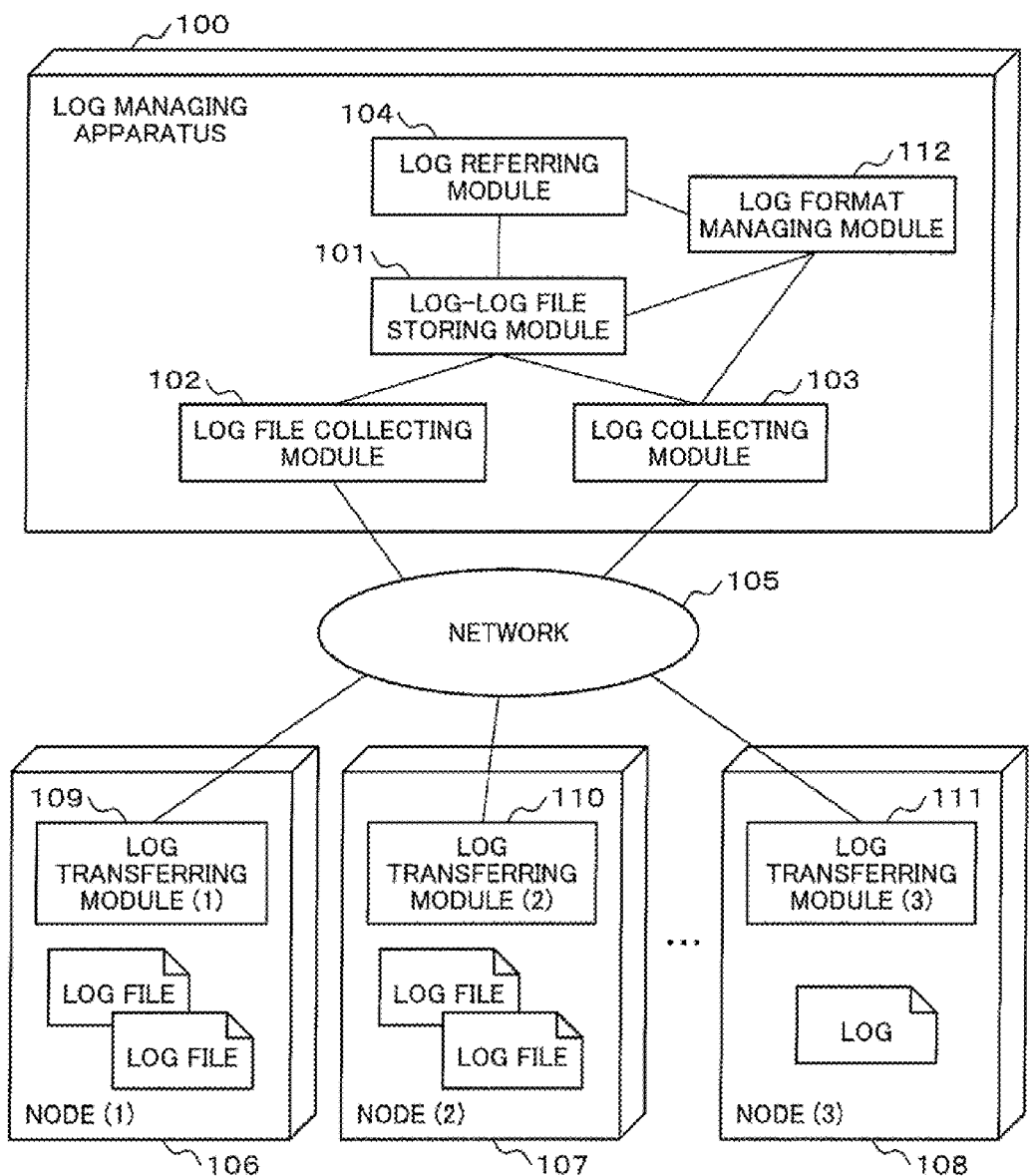
FIG. 2 is an exemplary diagram showing a configuration of log managing system 001.

FIG. 2 is an exemplary diagram showing a configuration of log managing system 001.

Log managing system 001 includes log managing apparatus 100, network 105, node (1) 106, node (2) 107 and node (3) 108.

Log managing apparatus 100 includes log-log file storing module 101, log file collecting module 102, log collecting module 103, log referring module 104 and log format managing module 112. Log managing apparatus 100 operates on the basis of program control.

Log-log file storing module 101 stores a log and a log file which have been collected by log file collecting module 102 and log collecting module 103. FIG. 3 is an exemplary diagram showing management information in log-log file storing module 101. Log-log file storing module 101 manages the storage location of log file data and a log property (such as a node which is the log collecting object, the file path of the log file on the node, the size of the log file and the time stamp (updating time) of the log file on the node).

Log file collecting module 102 and log collecting module 103 are examples of collecting unit 202.

Log file collecting module 102 collects the log files, which each include the time information and which each are transferred from at least one of log transferring module (1) 109 and log transferring module (2) 110, and transfers the collected log files and the collected property (such as nodes which are the log collecting objects, the file paths of the log files on the nodes, the size of the log files and the time stamp (updating time) of the log files on the nodes) to log-log file storing module 101.

Log collecting module 103 collects logs from log transferring module (3) 111, which transfers the logs in real time by use of a protocol for collecting, sending and receiving logs in real time such as the Syslog protocol, and carries out converting the character codes of the collected logs and complementing and correcting the time information and transferring the processed logs to log-log file storing module 101.

Log referring module 104 is an example of conversion unit 204.

Log referring module 104 carries out the conversion of a log and extracts the time information with reference to the log format (described later) which is specified by user, in response to a request for referring log. Specifically, log referring module 104 acquires a log and a log file, which user requests, from log-log file storing module 101 and indicates the log and the log file by use of the character code, the time zone and the form of time which user specifies.

Log format managing module 112 is an example of management unit 212.

FIG. 4 is an exemplary diagram showing the management information of log format managing module 112. Log format managing module 112 manages identification information which specifies the collecting object (for example, node), information which indicates the storage location of the log file within the collecting object (for example, file path), and the log format. The log format includes information on the character code, the time zone, the position of time information or the like for each classification of the log.

Node (1) 106, node (2) 107 and node (3) 108 are the log collecting objects, from which log managing apparatus 100 collects the logs, and are examples of collecting object 206 shown in FIG. 1. Node (1) 106, node (2) 107 and node (3) 108 include log transferring module (1) 109, log transferring module (2) 110 and log transferring module (3) 111 respectively and transfer the logs and the log files to log managing apparatus 100 by use of these modules respectively.

Log transferring module (1) 109 and log transferring module (2) 110 are examples of transferring unit 209. Log transferring module (1) 109 and log transferring module (2) 110 acquire the log files of the log collecting object, and transfers the log files and the property (such as the file path and the time stamp on the node) to log file collecting module 102.

Log transferring module (3) 111 is an example of transferring unit 209. Log transferring module (3) 111 transfers the logs to log collecting module 103. Log transferring module (3) 111 transfers the logs in real time by use of, for example, the Syslog protocol.

Next, an operation of the exemplary embodiment will be described with reference to drawings.

Figure 6:
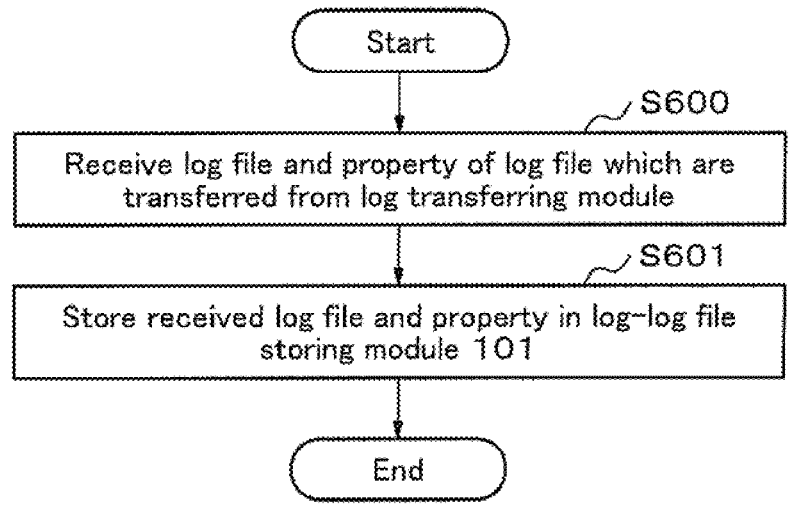
FIG. 6 is an exemplary flowchart showing an operation of log file collecting module 102.

FIG. 6 is an exemplary flowchart showing an operation of log file collecting module 102. First, log file collecting module 102 receives the log file and the property of the log file from log transferring module (1) 109 of node (1) 106 which is the log collecting object (step S600). In this case, it is assumed that information "node 1" which specifies node (1) 106, the file path "/var/adm/syslog/syslog.log" which specifies the storage location of the collected log file on node (1) 106, the file size "10240" of the log file and the time stamp (updating time) "2008/01/01 12:00:00 (Greenwich Mean Time, GMT)" are received as the property of the log file.

Log file collecting module 102 stores the received log file and the received property of the log file in log-log file storing module 101 (step S601).

Next, an operation of log-log file storing module 101 will be described.

Figure 7:
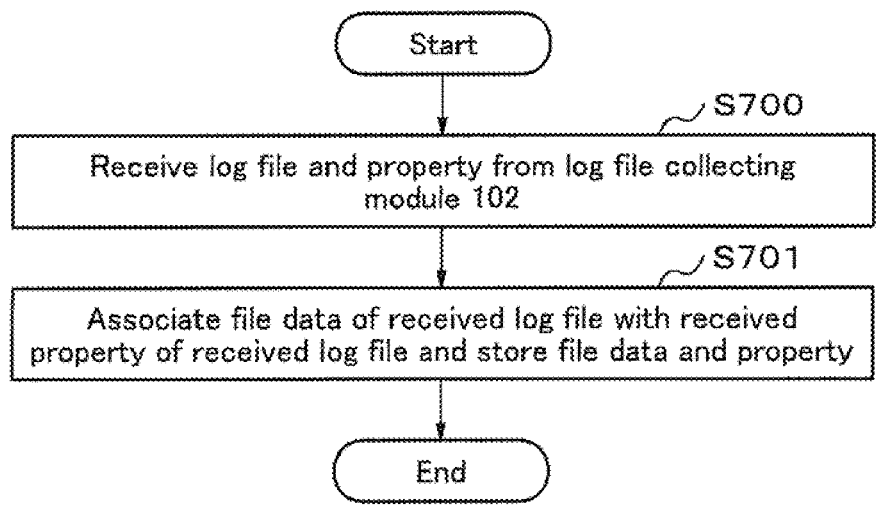
FIG. 7 is an exemplary flowchart showing an operation of log-log file storing module 101.

FIG. 7 is an exemplary flowchart showing the operation of log-log file storing module 101. Log-log file storing module 101 receives the log file and the property from log file collecting module 102 (step S700). Then, log-log file storing module 101 associates the file data of the received log file with the received property, and stores the file data and the property (step S701). In this case, it is assumed that the file data and the received property are stored in the storage location which is indicated as the file path "/var/opt/logmg/node1/file0000001".

Next, an operation of log referring module 104 in case that log referring module 104 receives a request for referring log will be described.

Figure 8:
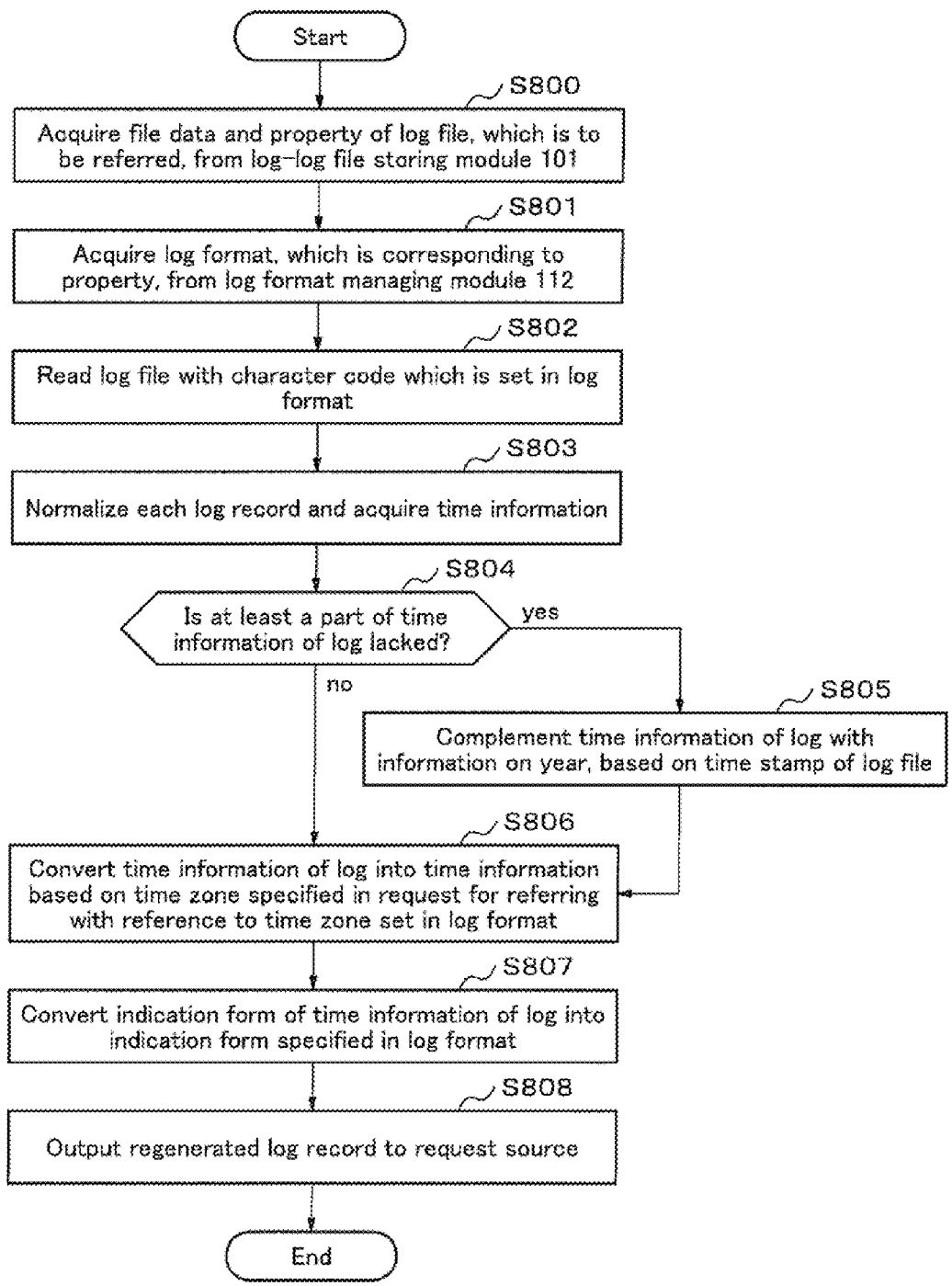
FIG. 8 is an exemplary flowchart showing an operation of log referring module 104.

FIG. 8 is an exemplary flowchart showing the operation of log referring module 104. When log referring module 104 receives the request for referring log, log referring module 104 acquires the file data and the property of the file data of the log file, which is requested to be referred, from log-log file storing module 101 (step S800). In this case, it is assumed that log referring module 104 receives the request to refer the log of node(1) 106 (log which is specified as file path "/var/adm/syslog/syslog.log") on the basis of the time information which is based on the time zone of "Japan Standard Time, JST (GMT+9:00)". Log referring module 104 acquires the file data of the log file from the data storing location which is specified as the file path "/var/opt/logmg/node1/file0000001".

Next, log referring module 104 acquires the log format, which is corresponding to "node 1" as the node, and "/var/adm/syslog/syslog.log" as the file path, from log format managing module 112 (step S801).

FIG. 5 is an exemplary diagram showing an example of the log format. In this case, it is assumed that log referring module 104 acquires "SyslogFileFormat01" as the log format. Moreover, it is assumed for "SyslogFileFormat01" to specify that the character code is "EUC-JP", the time zone of the log is "GMT", a segment of the log record is denoted as "^$" a regular expression to normalize the log is "(([a-zA-Z]{3}[¥s]{1,2}[0-9]{1,2}¥s[0-9]{1,2}:[0-9]{1,2}:[0-9]{1,2}))¥s ([^¥s]*)¥s([^¥S][^:]*:){0,1}¥s {0,1}(.*)", the position of the time information is "1", the form of the time information is "MMM dd HH:mm:ss", and the form of the converted time information is "yyyy/mm/dd HH:mm:ss".

Next, log referring module 104 reads the log file, based on the character code which is set in the log format (step S802). In this case, log referring module 104 reads the log file of node (1) 106 (log file specified as the file path "/var/adm/syslog/syslog.log"), based on the character code "EUC-JP". Through log referring module 104 specifying the character code and reading the log file on the basis of the character code, it is possible to handle the log file as data which program can interpret (in this case, the log file is converted into Unicode).

Next, log referring module 104 normalizes the read log file for each log record and acquires the time information of the log (step S803). In case that there are a plurality of classifications of log records, a plurality of regular expressions for the classifications of log records are set in the log format in advance, and log referring module 104 normalizes the log record, based on the regular expression corresponding to the log record.

Here, log referring module 104 acquires the time information from the log file, based on information on the position of the time information. That is, log referring module 104 acquires "Jan 1 12:00:00 (GMT)" as the time information of the log, from the log record "Jan 1 12:00:00 node1 sshd (pam_unix) [30339]: session opened for user root by (uid=0)".

Next, log referring module 104 judges whether at least a part of the time information of the log is lacked (step S804). In this case, above mentioned "Jan 1 12:00:00 (GMT)" as the time information of the log lacks information on year (yes in step S804). Moreover, in case that the log records have different time zones each other, a pair of the regular expression and the time zone, which are matched with each log record, is set in the log format in advance, and log referring module 104 converts the time zone of each log record (in this case, it is assumed that the time information is converted to the time information based on "GMT").

Log referring module 104 complements the time information of the log with reference to the time stamp (updating time) as complementation information (step S805). In this case, information on year of the time information is added. Further, the time stamp is an example of the complementation information and it may be preferable to use a receiving time of the log file or the like as the complementation information.

Figure 9:
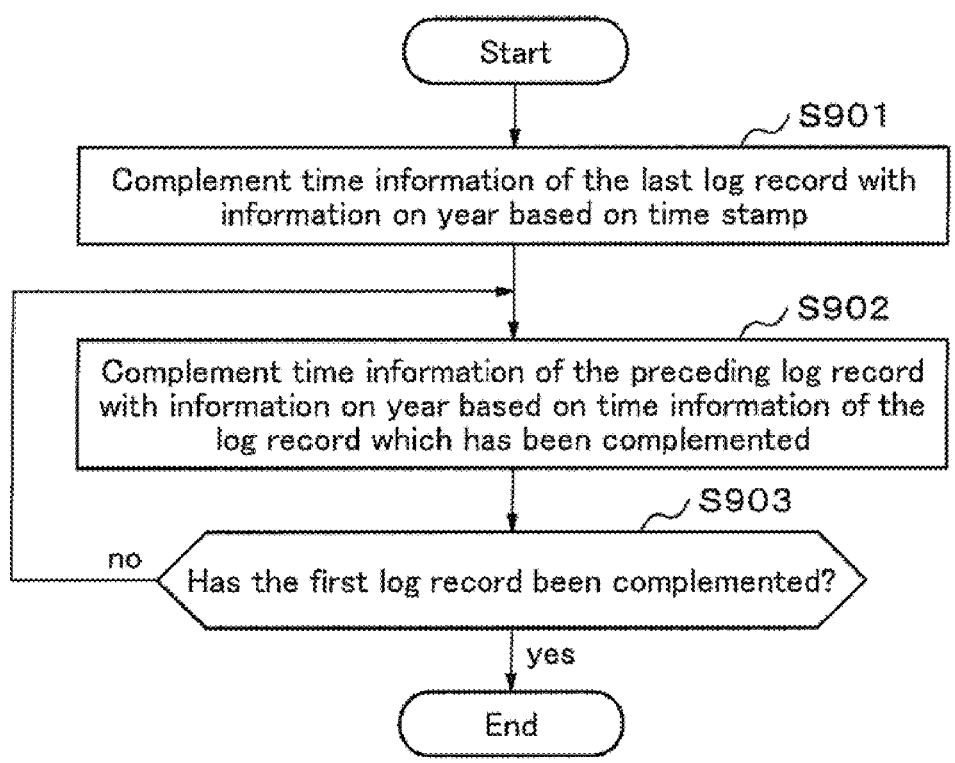
FIG. 9 is an exemplary flowchart showing details of step S805.

FIG. 9 is an exemplary flowchart showing details of step S805. First, log referring module 104 complements the time information of the last log record with the information on year out of the time information, based on the time stamp of the log file (step S901).

Figure 10:
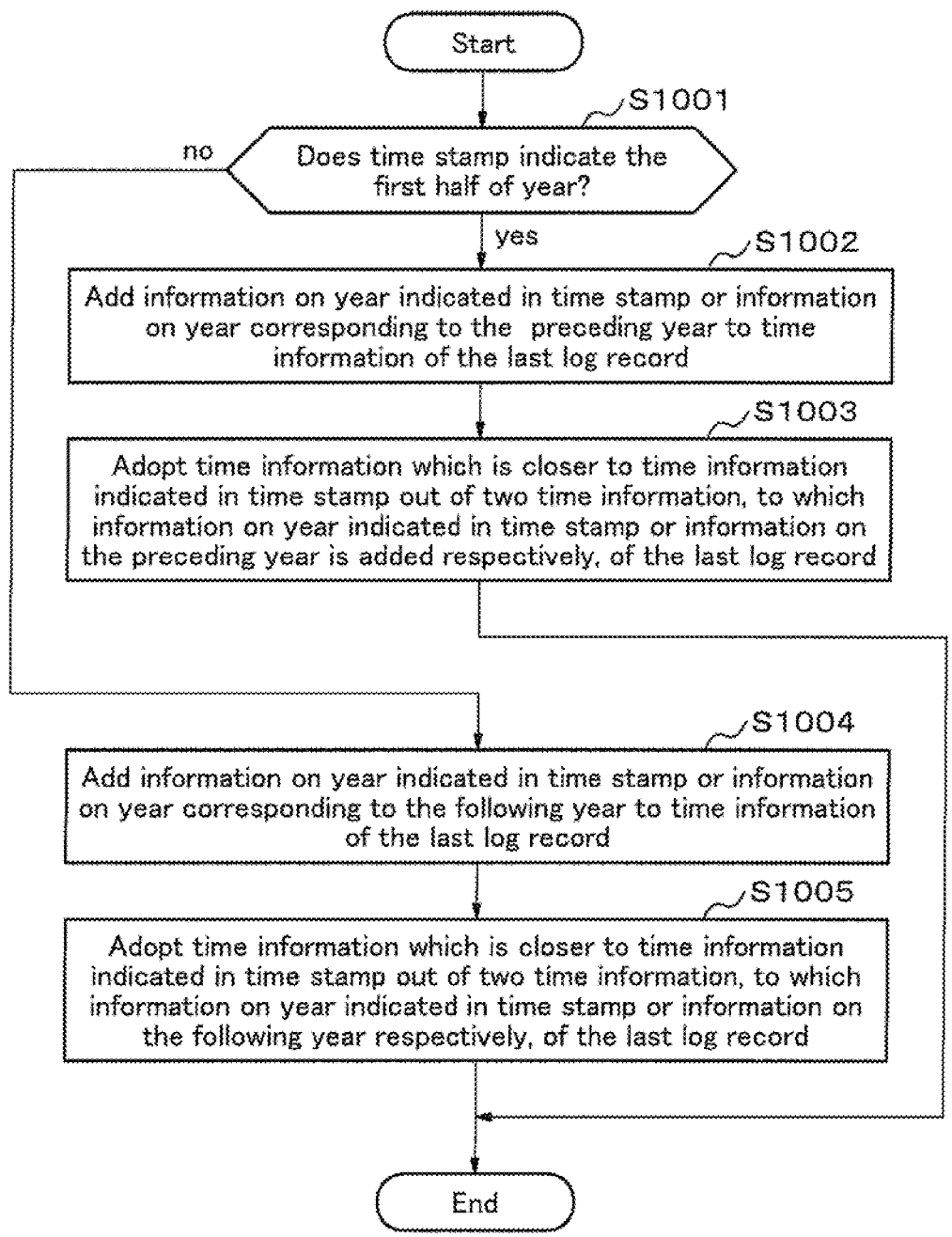
FIG. 10 is an exemplary flowchart showing details of step S901.

FIG. 10 is an exemplary flowchart showing details of step S901. In a procedure for complementing the time information with the information on year indicated in the time stamp, for example, in case that the time stamp of log file indicates the first half of year (yes in step S1001), log referring module 104 adds information on year, which is corresponding to the year indicated in the time stamp or the preceding year, to the time information of the last log record of the log file as the information on year (step S1002), and adopts the time information which is closer to the time information indicated in the time stamp of the log file out of two time information to which the information on year is added respectively (step S1003).

On the other hand, in case that the time stamp of the log file indicates the second half of year (no in step S1001), log referring module 104 adds the information on year, which is corresponding to the year indicated in the time stamp or the following year, to the time information of the last log record of the log file as the information on year (step S1004), and adopts the time information which is closer to the time information indicated in the time stamp of the log file out of two time information to which the information on year is added respectively (step S1005).

Next, log referring module 104 complements the time information of the preceding log record, which precedes the log record which has been complemented, with the information on year which is a part of time information, based on the time information of the log record which has been complemented (step S902).

Figure 11:
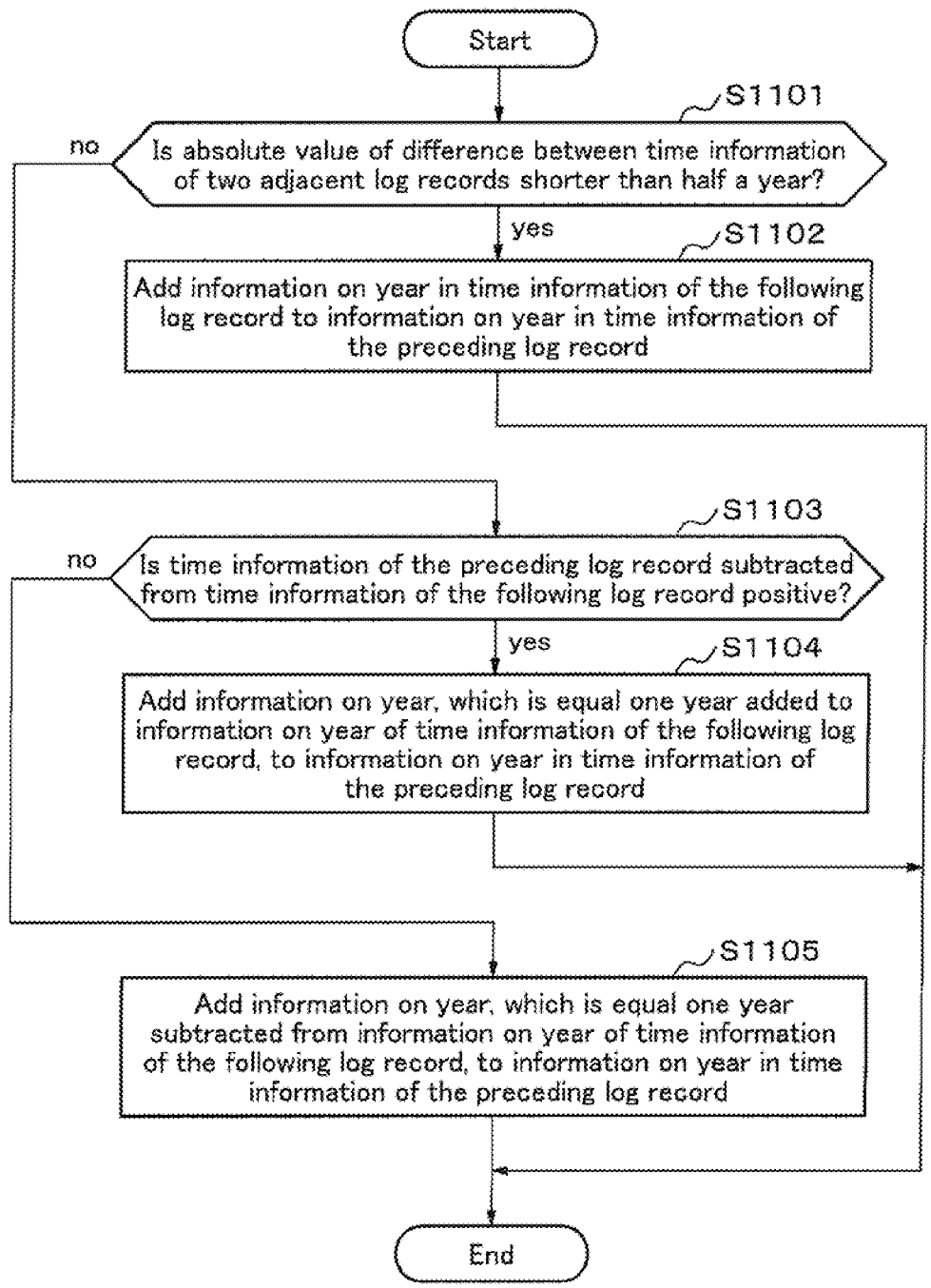
FIG. 11 is an exemplary flowchart showing details of step S902.

FIG. 11 is an exemplary flowchart showing details of step S902. Log referring module 104 adds the information on year to the log record of the log file in sequence through going back from the last log record of the log file. In case that an absolute value of difference between the time information of two adjacent log records is shorter than half a year (for example, a case that the time information of the following log record is "Jan 1 01:00:00" and time information of the preceding log record is "Jan 1 23:00:00" or a case that the time information of the following log record is "Jan 2 02:00:00" and time information of the preceding log record is "Jan 1 23:00:00") (yes in step S1101), log referring module 104 judges that these two adjacent log records belong to an identical year and then, adds the information on year, which is identical to the information on year of the time information of the following log record out of two adjacent log records, to the information on year of the time information of the preceding log record (step S1102). Here, the time information of the following log record means the time information of a log record which is closer to the last log record of the log file (the time information to which information on year has been already added). Moreover, the time information of the preceding log record means the time information of a log record which is further from the last log record of the log file (the time information to which information on year will be added).

In case that an absolute value of difference between the time information of two adjacent log records is longer than half a year and in case that time information of the preceding log record subtracted from the time information of the following log record is positive (for example, a case that the time information of the following log record is "Dec 31 23:59:58" and the time information of the preceding log record is "Jan 1 1:00:00") (yes in step S1103), log referring module 104 judges that these two adjacent log records belong to different years each other and then, adds information on year, which is equal to one year added to the information on year of the time information of the following log record, to the time information of the preceding log record as the information on year (step S1104).

In case that an absolute value of difference between the time information of two adjacent log records is longer than half a year and in case that time information of the preceding log record subtracted from the time information of the following log record is negative (for example, a case that the time information of the following log record is "Jan 1 1:00:00" and the time information of the preceding log record is "Dec 31 23:00:00") (no in step S1103), log referring module 104 judges that these two adjacent log records belong to different years each other and then, adds information on year, which is equal to one year subtracted from the information on year of the time information of the following log record, to the time information of the preceding log record as the information on year (step S1105).

Next, log referring module 104 judges whether the first log record has been complemented (step S903). In case that the first log record has been complemented (yes in step S903), log referring module 104 ends the processing of complementing the time information of the log on the basis of the time stamp of the log file. On the other hand, in case that the first log record has not been complemented (no in step S903), log reference module 104 returns to the processing of step S901. As a result, log referring module 104 can carry out the processing of complementing the time information of the log on the basis of the time stamp of the log file until head of the log file.

Further, while the processing to complement the time information with the information on year, which is one of time units (for example, year, month, day, hour, minute and second) of the time information, has been described, it is preferable that, in case that the time information lacks the information on both year and month for example, log referring module 104 judges whether difference of the time information is longer than half a year and half a month respectively and complements the time information with the information on both year and month respectively, on the basis of the time stamp. It is also preferable that log referring module 104 complements the time information with the information on day and the following time units similarly.

In this case, it is assumed that the time information of log records of the log file are "Jan 1 12:00:00", "Jan 1 01:00:00", "Dec 31 23:00:00", and "Dec 31 11:00:00" in the order from the last record, and the added information on year are 2008, 2008, 2007 and 2007 respectively in the order from the last record.

Next, in case of no in step S804 or in case that the processing of step S805 has been ended, log referring module 104 converts the time information of the log to the time information based on the time zone which is specified in the request for referring log with reference to the time zone set in the log format (step S806). In this case, it is assumed that the time information on the basis of the time zone "GMT" is converted to the time information on the basis of the time zone "JST (GMT+9:00)". For example, the above mentioned time information are converted to "Jan 1 2008 21:00:00", "Jan 1 2008 10:00:00", "Jan 1 2008 08:00:00", and "Dec 31 2007 20:00:00" respectively.

Next, log referring module 104 converts the indication form of the time information of the log to the indication form which is specified in the log format (step S807). In this case, "Jan 1 2008 21:00:00", "Jan 1 2008 10:00:00", "Jan 1 200808:00:00" and "Dec 31 2007 20:00:00" are converted to "2008/01/01 21:00:00", "2008/01/01 10:00:00", "2008/01/01 08:00:00" and "2007/12/31 20:00:00" respectively.

Next, log referring module 104 outputs the regenerated log record to the request source (step S808). In this case, log reference module 104 outputs "2008/01/01 21:00:00 node1 sshd (pam_unix) [30339]: session opened for user root by (uid=0)" which is converted from "Jan 1 12:00:00 node1 sshd (pam_unix) [30339]: session opened for user root by (uid=0)".

As described above, the exemplary embodiment of the present invention has an effect that the time information of the log can be read correctly. The reason is that log managing apparatus 100 manages the log format which is set for each log collecting object. Even if the position of the time information, the character code, the time zone or the like is different for each log collecting object, log managing apparatus 100 can read the time information of the log correctly with reference to the log format.

Moreover, the exemplary embodiment of the present invention has an effect that the time information of the log can be complemented correctly. The reason is that log referring module 104 receives the log file, which includes a plurality of log records, from the log collecting object and in case that at least a part of the time information of the log record is lacked, log referring module 104 complements the time information of the last log record of the received log file, based on the complementation information (for example, time stamp of log file (updating time) or log receiving time), and complements the time information of the log record preceding the log record whose time information has been complemented, on the basis of the time information of the complemented log record.

Next, a second exemplary embodiment of the present invention will be described in detail with reference to drawings.

While log file collecting module 102 receives the log files from the log transferring modules (1) 109 and (2) 110 according to the first exemplary embodiment of the present invention, log collecting module 103 receives the logs (log records) from log transferring module (3) 111 according to the second exemplary embodiment of the present invention. Moreover, while log referring module 104 carries out the function of conversion unit 204 shown in FIG. 1 according to the first exemplary embodiment of the present invention, log collecting module 103 carries out not only the function of collecting the logs but also the function of conversion unit 204 according to the second exemplary embodiment of the present invention. A configuration of the second exemplary embodiment of the present invention is the same as one of the first exemplary embodiment of the present invention shown in FIG. 2. Hereinafter, an operation of the second exemplary embodiment of the present invention will be described in detail.

Figure 12:
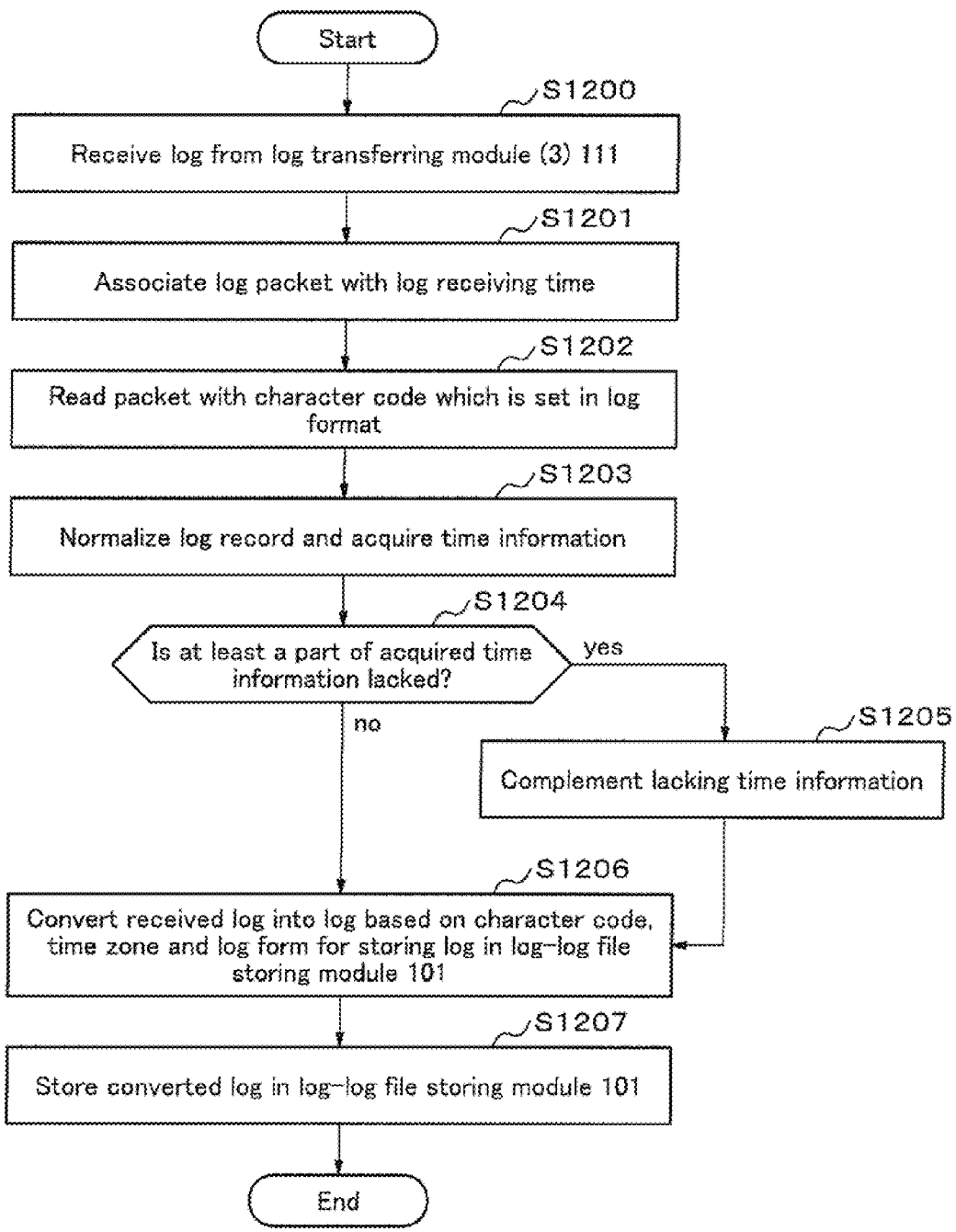
FIG. 12 is an exemplary flowchart showing an operation of log collecting module 103.

FIG. 12 is an exemplary flowchart showing an operation of log collecting module 103.

When log collecting module 103 receives the log from log transferring module (3) 111 of node (3) 108 which is the log collecting object, log collecting module 103 acquires the log format, which is corresponding to the received log, from log format managing module 112. In this case, it is assumed that log collecting module 103 acquires the log format "Syslog-Format02" which is shown in FIG. 5. "SyslogFormat02" specifies that the character code is "EUC-JP", the time zone of the log is "JST", the segment of the log record is denoted as "^$", the regular expression to normalize the log is "<([0-9]{1,3})>(([a-zA-Z]{3}[¥s]{1,2}[0-9]{1,2}¥s[0-9]{1,2}:[0-9]{1,2}:[0-9]{1,2}))¥s([^¥s]*(.*)", whether presence or absence of time information is "presence", whether presence or absence of a host name is "presence", the position of the time information is "2", the form of the time information is "MMM dd HH:mm:ss", the form of the converted time information is "yyyy/mm/dd HH:mm:ss", and the position for storing log information is "2, 3 and 4".

Log collecting module 103 receives the log from log transferring module (3) 111 of node (3) 108 which is the log collecting object (step S1200). In this case, it is assumed that log transferring module (3) 111 transfers the log with the Syslog protocol in real time.

Next, log collecting module 103 associates the log packet with the log receiving time (step S1201). In this case, it is assumed that the received log packet is associated with the log receiving time which is "2008/01/02 03:00:00 (GMT)".

Next, log collecting module 103 reads the received log packet, based on the character code specified in the log format (step S1202). In this case, it is assumed that log collecting module 103 reads the received log packet, based on the character code "EUC-JP" and reads the character string "<38>Jan 2 12:00:01 node3 sshd (pam_unix) [30340]: session opened for user root by (uid=0)", which program can interpret.

Next, log collecting module 103 normalizes the log record and acquires the time information (step S1203). Then, log collecting module 103 judges whether at least a part of the acquired time information is lacked (step S1204). In this case, log collecting module 103 acquires "Jan 2 12:00:01 (JST)" ("Jan 2 03:00:01 (GMT)") as the time information, and consequently, finds out that the information on year is lacked in comparison of the acquired time information with the form of the converted time information "yyyy/mm/dd HH:mm:ss" (yes in step S1204). Moreover, in case that the log records have different time zones each other, a pair of the regular expression and the time zone which are matched with each log record is set in advance, and log collecting module 103 carries out conversion of the time zone (in this case, it is assumed that the time information is converted to the time information based on "GMT").

Next, log collecting module 103 complements the lacking time information, based on the log receiving time as the complementation information (step S1205). While it is exemplified that the lacking time information is complemented on the basis of the log receiving time, it may be preferable that the lacking time information is complemented, based on the time stamp (updating time) of the log.

Figure 13:
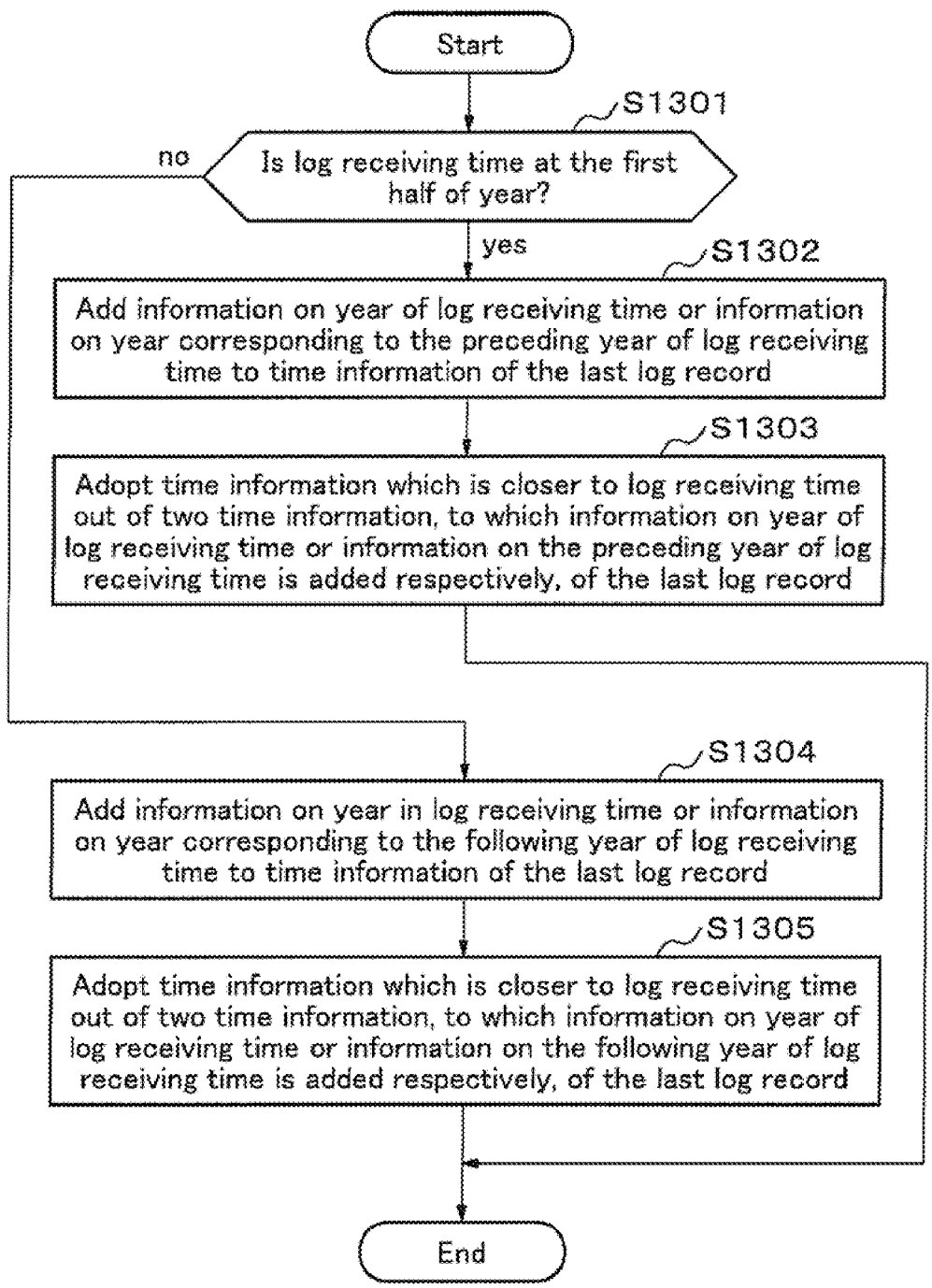
FIG. 13 is an exemplary flowchart showing details of step S1205.

FIG. 13 is an exemplary flowchart showing details of step S1205. In the procedure for complementing the lacking time information with the information on year on the basis of the log receiving time, in case that the log receiving time is at the first half of year (yes in step S1301), log collecting module 103 adds information on year, which is corresponding to the year of the log receiving time or the preceding year of the log receiving time, to the time information of the log as the information on year (step S1302), and adopts the time information which is closer to the log receiving time out of two time information to which the information on year is added respectively (step S1303).

On the other hand, in case that the log receiving time is at the second half of year (no in step S1301), log collecting module 103 adds information on year, which is corresponding to the year of the log receiving time or the following year of the log receiving time, to the time information of the log as the information on year (step S1304), and adopts the time information which is closer to the year of the log receiving time out of two time information to which the information on year is added respectively (step S1305).

Further, while the processing to complement the time information with the information on year, which is one of time units (for example, year, month, day, hour, minute and second) of the time information, has been described also according to the exemplary embodiment of the present invention, it is preferable that, in case that the time information lacks the information on both year and month, log collecting module 103 narrows down range of the information on both year and month to be added based on whether the log receiving time is at the first half of year or not and at the first half of month or not, and complements the time information with the information on both year and month which is closer to the log receiving time. Log collecting module 103 may complement similarly the time information with the information on day and the following time units. In case that the log contains no time information, it may be preferable that log collecting module 103 may add the log receiving time as the time information of the log as it is. In this case, since the log receiving time "2008/01/02 03:00:00 (GMT)" is at the first half of year, log collecting module 103 adds year of "2008" or "2007" to the time information "Jan 2 03:00:01 (GMT)" and compares the complemented time information with the log receiving time "2008/01/02 03:00:00 (GMT)". Since the time information, to which year of "2008" is added, is closer to the log receiving time as a result of the comparison, the time information after the complementation processing results in "2008/01/02 03:00:01 (GMT)".

Next, in case of no in step S1204 or in case that the processing of step S1205 has been completed, log collecting module 103 converts the received log into the log based on the character code, the time zone and the log form which are for storing the log in log-log file storing module 101 (step S1206). In this case, it is assumed the character code is "EUC-JP", the time zone of log is "JST" and the form of the time information is "yyyy/mm/dd HH:mm:ss". Log collecting module 103 converts the received log into "2008/01/02 12:00:01 node3 sshd (pam_unix) [30340]: session opened for user root by (uid=0)".

Next, log collecting module 103 stores the converted log in log-log file storing module 101 (step S1207). In this case, "2008/01/02 12:00:01 node3 sshd (pam_unix) [30340]: session opened for user root by (uid=0)" is stored.

Next, an operation of log-log file storing module 101, which starts after completion of the above mentioned operation of log collecting module 103, will be described.

Figure 14:
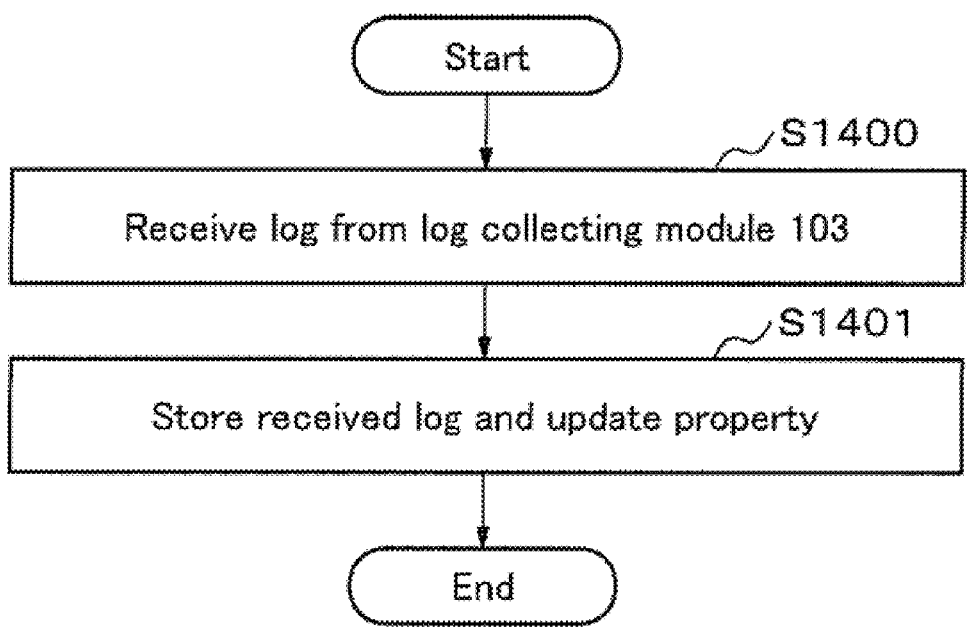
FIG. 14 is an exemplary flowchart showing an operation of log-log file storing module 101.

FIG. 14 is an exemplary flowchart showing the operation of log-log file storing module 101. In case that log-log file storing module 101 receives the converted log from log collecting module 103 (step S1400), log-log file storing module 101 stores the log in the data storing location and updates the property (step S1401). In this case, "2008/01/02 12:00:01 node3 sshd (pam_unix) [30340]: session opened for user root by (uid=0)" is stored in the storage location which is specified as the file path "/var/opt/logmg/node3/file0000002". Moreover, size of the log is increased by the stored log size and the time stamp is updated to a storing time.

The exemplary embodiment of the present invention also has an effect that the time information of the log can be grasped correctly.

The reason is that log managing apparatus 100 receives the log record transferred from the log collecting object in real time, and associates the log record with the complementation information and, in case that at least a part of the time information of the log record is lacked, complements the lacking time information, based on the complementation information.

The apparatus, which is described in Japanese Patent Application Laid-Open No. 2005-284520, causes a problem that it is impossible to carry out a proper log management on the basis of the time information. An example of technology to solve the problem mentioned above is disclosed in Japanese Patent Application Laid-Open No. 2004-334664 as a system which is related to a method for collecting transaction information. According to the system, first, an user system carries out a character code conversion of the transaction information, and next, the collecting system converts the date and time of the transaction to the date and time based on the domestic time zone.

Moreover, Japanese Patent Application Laid-Open No. 2005-327053 discloses a log information managing apparatus which, in case that log information does not include a job creating time, sets a log receiving time as the job creating time.

Furthermore, Japanese Patent Application Laid-Open No. 1993-073168 discloses a date and time processing apparatus which, in case that the time information includes only information on day, hour, minute and second, adds information on year and month which seem to be optimum.

However, the system, which is disclosed in Japanese Patent Application Laid-Open No. 2004-334664 mentioned above, causes a problem that the time information may not be read correctly. The reason is that the position of time information, the character code, the time zone or the like is different for each log collecting object.

Similarly to the apparatus disclosed in Japanese Patent Application Laid-Open No. 2005-284520, the apparatuses which are disclosed in Japanese Patent Application Laid-Open No. 2005-327053 and Japanese Patent Application Laid-Open No. 1993-073168 mentioned above, cause the problem that the time information of the log can not be complemented correctly in case that the log contains no time information or in case that the log does not contain a part of the time information. The reason is that, in case that a long period log is received for example, the time information of each log is complemented, based on the same log receiving time.

As a result, the system and the apparatus, which are disclosed in Japanese Patent Application Laid-Open No. 2004-334664, Japanese Patent Application Laid-Open No. 2005-327053 and Japanese Patent Application Laid-Open No. 1993-073168 mentioned above, cause a problem that log management based on the time information can not be carried out correctly.

An exemplary advantage according to the invention is that the time information of the log can be grasped correctly.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A log managing apparatus, comprising:
hardware;
a collecting unit that receives a log from at least one collecting object that acquires said log including time information;
a management unit that manages log format information set for each said collecting object; and
a conversion unit that converts said log with reference to said log format information and extracts time information from said log, wherein
the hardware implements the collecting unit, the management unit, and the conversion unit, wherein
said conversion unit receives a log file that includes a plurality of log records, as said log from said collecting object, and when one of said plurality of log records includes time information, at least a part thereof being lacked, complements time information of said log record based on complementation information which is an updating time or a receiving time of said log file, and wherein
in case that a lacking part of time information of said log record is information on a certain time unit,
said conversion unit complements time information of said log record by adopting time information that is closer to said complementation information out of time information derived by adding information on said time unit included in said complementation information to time information of said log record and derived by adding information on said time unit calculated by subtracting one from information on said time unit included in said complementation information to time information of said log record, in case that a time indicated in said complementation information is at the first half of said time unit, and
said conversion unit complements time information of said log record by adopting time information that is closer to said complementation information out of time information derived by adding information on said time unit included in said complementation information to time information of said log record and derived by adding information on said time unit calculated by adding one to information on said time unit included in said complementation information to time information of said log record, in case that a time indicated in said complementation information is at the second half of said time unit.

2. The log managing apparatus according to claim 1, wherein
in case that time information of a preceding log record is complemented based on the complemented time information of said log record,
said conversion unit adds information on said time unit included in time information of said log record, to time information of said preceding log record, in case that an absolute value of difference between time information of said preceding log record and said log record is shorter than half a said time unit,
said conversion unit adds information on said time unit calculated by adding one to information on said time unit in time information of said log record to time information of said preceding log record, in case that an absolute value of difference between time information of said preceding log record and said log record is longer than half a said time unit and time information of said preceding log record subtracted from time information of said log record is positive, and said conversion unit adds information on time unit calculated by subtracting one from information on said time unit in time information of said log record to time information of said preceding log record, in case that an absolute value of difference between time information of said preceding log record and said log record is longer than half a said time unit and time information of said preceding log record subtracted from time information of said log record is negative.

3. The log managing apparatus according to claim 1, wherein said time unit is at least one of year, month, day, hour, minute and second.

4. A log managing system, comprising:

at least one of log collecting object including hardware and a transferring unit implemented by the hardware that acquires a log containing time information and transfers said acquired log; and a log managing apparatus including hardware, a collecting unit that receives said log from said collecting object, a management unit that manages log format information set for each said collecting object, and a conversion unit that converts said log with reference to said log format information and extracts time information from said log, where the collecting unit, the management unit, and the conversion unit are each implemented by the hardware, wherein said conversion unit receives a log file that includes a plurality of log records, as said log from said collecting object, and when one of said plurality of log records includes time information, at least a part thereof being lacked, complements time information of said log record based on complementation information which is an updating time or a receiving time of said log file, and wherein in case that a lacking part of time information of said log record is information on a certain time unit, said conversion unit complements time information of said log record by adopting time information that is closer to said complementation information out of time information derived by adding information on said time unit included in said complementation information to time information of said log record and derived by adding information on said time unit calculated by subtracting one from information on said time unit included in said complementation information to time information of said log record, in case that a time indicated in said complementation information is at the first half of said time unit, and said conversion unit complements time information of said log record by adopting time information that is closer to said complementation information out of time information derived by adding information on said time unit included in said complementation information to time information of said log record and derived by adding information on said time unit calculated by adding one to information on said time unit included in said complementation information to time information of said log record, in case that a time indicated in said complementation information is at the second half of said time unit.

5. A log managing method, comprising:

receiving a log from at least one collecting object that acquires said log containing time information; and converting said log with reference to log format information set for each said collecting object and extracting time information from said log, wherein said converting receives a log file that includes a plurality of log records, as said log from said collecting object, and when one of said plurality of log records includes time information, at least a cart thereof being lacked complements time information of said log record based on complementation information which is an updating time or a receiving time of said log file and wherein in case that a lacking part of time information of said log record is information on a certain time unit, said converting complements time information of said log record by adopting time information that is closer to said complementation information out of time information derived by adding information on said time unit included in said complementation information to time information of said log record and derived by adding information on said time unit calculated by subtracting one from information on said time unit included in said complementation information to time information of said log record, in case that a time indicated in said complementation information is at the first half of said time unit, and said converting complements time information of said log record by adopting time information that is closer to said complementation information out of time information derived by adding information on said time unit included in said complementation information to time information of said log record and derived by adding information on said time unit calculated by adding one to information on said time unit included in said complementation information to time information of said log record, in case that a time indicated in said complementation information is at the second half of said time unit.

6. A non-transitory computer readable medium recording thereon a program, causing a computer to perform a method comprising:

receiving a log from at least one collecting object that acquires said log containing time information; and converting said log with reference to log format information set for each said collecting object and extracting time information from said log, wherein said converting receives a log file that includes a plurality of log records, as said log from said collecting object, and when one of said plurality of log records includes time information, at least a cart thereof being lacked complements time information of said log record based on complementation information which is an updating time or a receiving time of said log file and wherein in case that a lacking part of time information of said log record is information on a certain time unit, said converting complements time information of said log record by adopting time information that is closer to said complementation information out of time information derived by adding information on said time unit included in said complementation information to time information of said log record and derived by adding information on said time unit calculated by subtracting one from information on said time unit included in said complementation information to time information of said log record, in case that a time indicated in said complementation information is at the first half of said time unit, and said converting complements time information of said log record by adopting time information that is closer to said complementation information out of time information derived by adding information on said time unit included in said complementation information to time information of said log record and derived by adding information on said time unit calculated by adding one to information on said time unit included in said complementation information to time information of said log record, in case that a time indicated in said complementation information is at the second half of said time unit.

7. A log managing apparatus, comprising:

means for receiving a log from at least one collecting object that acquires said log containing time information;

means for managing log format information set for each said collecting object; and means for converting said log with reference to said log format information and for extracting time information from said log, wherein said means for converting receives a log file that includes a plurality of log records, as said log from said collecting object, and when one of said plurality of log records includes time information, at least a part thereof being lacked, complements time information of said log record based on complementation information which is an updating time or a receiving time of said log file, and wherein in case that a lacking part of time information of said log record is information on a certain time unit, said means for converting complements time information of said log record by adopting time information that is closer to said complementation information out of time information derived by adding information on said time unit included in said complementation information to time information of said log record and derived by adding information on said time unit calculated by subtracting one from information on said time unit included in said complementation information to time information of said log record, in case that a time indicated in said complementation information is at the first half of said time unit, and said means for converting complements time information of said log record by adopting time information that is closer to said complementation information out of time information derived by adding information on said time unit included in said complementation information to time information of said log record and derived by adding information on said time unit calculated by adding one to information on said time unit included in said complementation information to time information of said log record, in case that a time indicated in said complementation information is at the second half of said time unit.

8. A log management system, comprising:

at least one log collecting object including means for acquiring a log containing time information and for transferring said acquired log; and a log managing apparatus including means for receiving said log from said collecting object, means for managing log format information set for each said collecting object, and means for converting said log with reference to said log format information and for extracting time information from said log, wherein said means for converting receives a log file that includes a plurality of log records, as said log from said collecting object, and when one of said plurality of log records includes time information, at least a part thereof being lacked, complements time information of said log record based on complementation information which is an updating time or a receiving time of said log file, and wherein in case that a lacking part of time information of said log record is information on a certain time unit, said means for converting complements time information of said log record by adopting time information that is closer to said complementation information out of time information derived by adding information on said time unit included in said complementation information to time information of said log record and derived by adding information on said time unit calculated by subtracting one from information on said time unit included in said complementation information to time information of said log record, in case that a time indicated in said complementation information is at the first half of said time unit, and said means for converting complements time information of said log record by adopting time information that is closer to said complementation information out of time information derived by adding information on said time unit included in said complementation information to time information of said log record and derived by adding information on said time unit calculated by adding one to information on said time unit included in said complementation information to time information of said log record, in case that a time indicated in said complementation information is at the second half of said time unit.

9. A log management method, comprising:

a step for receiving a log from at least one collecting object that acquires said log containing time information; and a step for converting said log with reference to log format information set for each said collecting object and for extracting time information from said log, wherein said step for converting receives a log file that includes a plurality of log records, as said log from said collecting object, and when one of said plurality of log records includes time information, at least a part thereof being lacked, complements time information of said log record based on complementation information which is an updating time or a receiving time of said log file, and wherein in case that a lacking part of time information of said log record is information on a certain time unit, said step for converting complements time information of said log record by adopting time information that is closer to said complementation information out of time information derived by adding information on said time unit included in said complementation information to time information of said log record and derived by adding information on said time unit calculated by subtracting one from information on said time unit included in said complementation information to time information of said log record, in case that a time indicated in said complementation information is at the first half of said time unit, and said step for converting complements time information of said log record by adopting time information that is closer to said complementation information out of time information derived by adding information on said time unit included in said complementation information to time information of said log record and derived by adding information on said time unit calculated by adding one to information on said time unit included in said complementation information to time information of said log record, in case that a time indicated in said complementation information is at the second half of said time unit.

* * * * *